United States Patent [19]

Specktor

[11] Patent Number: 5,163,699
[45] Date of Patent: Nov. 17, 1992

[54] CAM WASHER FOR ADJUSTING WHEEL ALIGNMENT

[75] Inventor: Gerald A. Specktor, St. Paul, Minn.

[73] Assignee: Shim-A-Line, Inc., Minneapolis, Minn.

[21] Appl. No.: 459,072

[22] Filed: Dec. 29, 1989

[51] Int. Cl.⁵ .............................................. B62D 17/00
[52] U.S. Cl. .................................. 280/661; 74/568 R; 403/4
[58] Field of Search .............. 280/661, 96.1, 688; 411/105, 108, 119, 120, 121, 123, 124, 148, 149, 150, 169, 398, 427, 533; 81/176.1, 176.15, 488, 176.2, 125; 403/4; 292/DIG. 60, 251; 74/568 R

[56] References Cited

U.S. PATENT DOCUMENTS

| | | | |
|---|---|---|---|
| 299,969 | 6/1884 | Fahy | 411/533 |
| 515,089 | 2/1894 | McClelland | 411/533 |
| 719,745 | 2/1903 | Carlton | 411/119 |
| 732,411 | 6/1903 | Hughes | 411/149 |
| 751,202 | 2/1904 | Porter | 30/193 |
| 1,044,055 | 11/1912 | Johnson et al. | 403/107 |
| 1,181,109 | 5/1916 | Carr | 411/149 |
| 1,261,616 | 4/1918 | Reinicker | 411/120 |
| 1,279,686 | 9/1918 | Hale | 411/163 |
| 2,063,704 | 12/1936 | Slack | 280/661 |
| 2,162,828 | 6/1939 | Slack | 280/661 |
| 2,674,465 | 4/1954 | Carpezzi | 280/661 |
| 2,772,596 | 12/1956 | Trussell | 411/535 |
| 2,846,250 | 8/1958 | Davis | 403/108 |
| 2,859,058 | 11/1958 | Traugott | 403/20 |
| 2,934,684 | 4/1960 | Fegan | 357/77 |
| 2,962,317 | 11/1960 | Morse | 292/251 |
| 2,978,253 | 4/1961 | Weiss et al. | 280/661 |
| 3,033,588 | 5/1962 | Muller et al. | 280/661 |
| 3,124,370 | 3/1964 | Traugott | 280/661 |
| 3,163,441 | 12/1964 | Traugott | 280/661 |
| 3,389,735 | 6/1968 | Katz | 411/120 |
| 3,880,444 | 4/1975 | Bridges | 280/661 |
| 4,595,216 | 6/1986 | Ware | 280/661 |
| 4,616,845 | 10/1986 | Pettibone | 280/661 |
| 4,618,162 | 10/1986 | Specktor et al. | 280/661 |
| 4,706,987 | 11/1987 | Pettibone et al. | 280/661 |
| 4,736,964 | 4/1988 | Specktor | 280/661 |
| 4,971,352 | 11/1990 | Jordan | 280/661 |

FOREIGN PATENT DOCUMENTS 127427  6/1919  United Kingdom ............... 411/120

Primary Examiner—Charles A. Marmor
Assistant Examiner—Tamara L. Finlay
Attorney, Agent, or Firm—Kinney & Lange

[57] ABSTRACT

A device for adjusting at least one alignment characteristic of an automotive vehicle wheel that is adjustable through an adjusting bolt and nut, the device including a cam member having an eccentrically disposed aperture that receives the bolt. The cam member includes a mechanism for detachably attaching the cam member to the nut or to the head of the bolt such that the cam member is rotatable by engagement of the nut or the head of the bolt. When the cam member is rotated, the member works against a cam member bearing surface such that the bolt is moved sideways thereby adjusting camber.

9 Claims, 4 Drawing Sheets

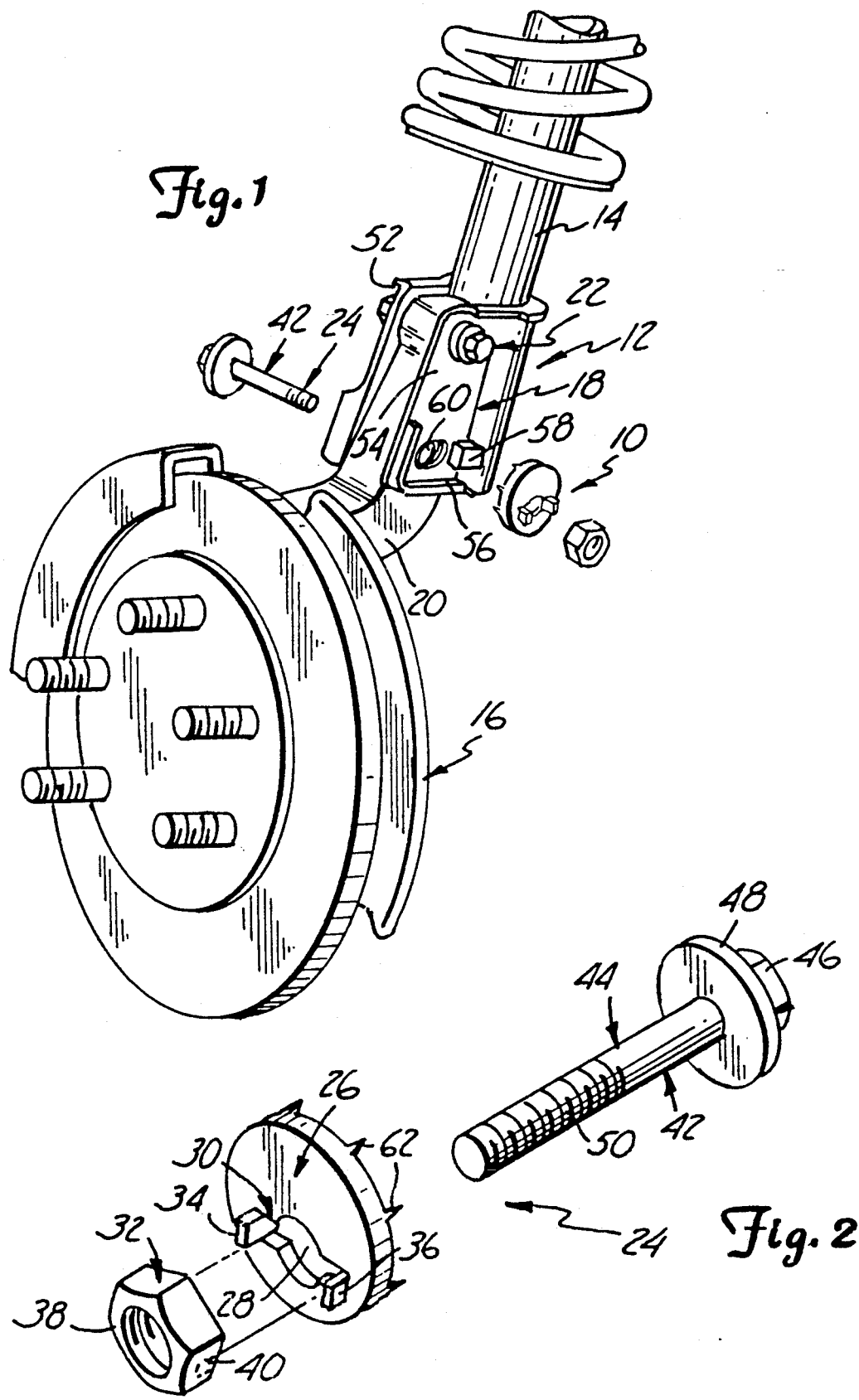

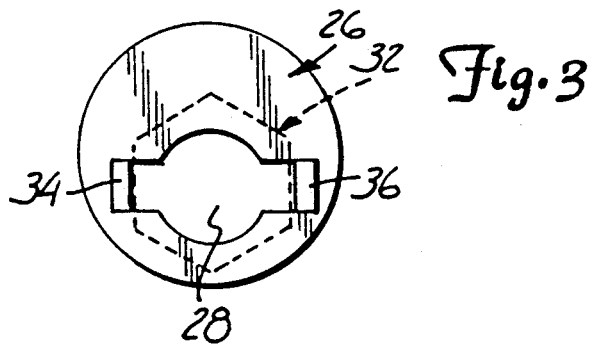
Fig. 3
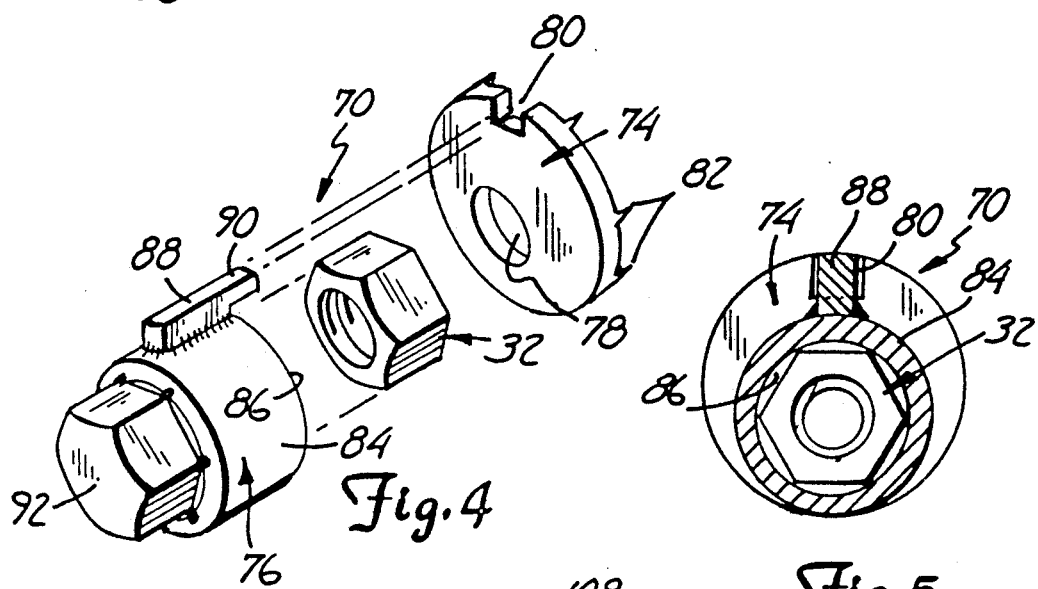
Fig. 4
Fig. 5
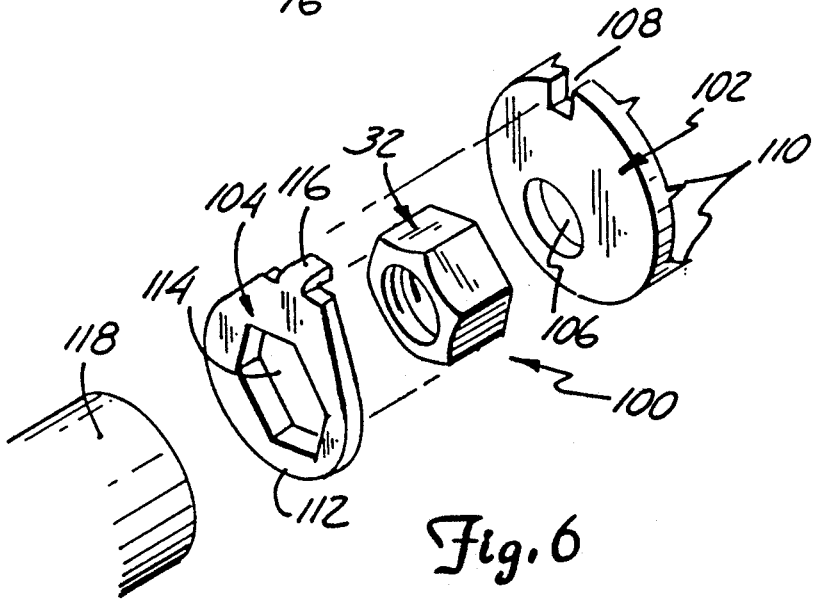
Fig. 6

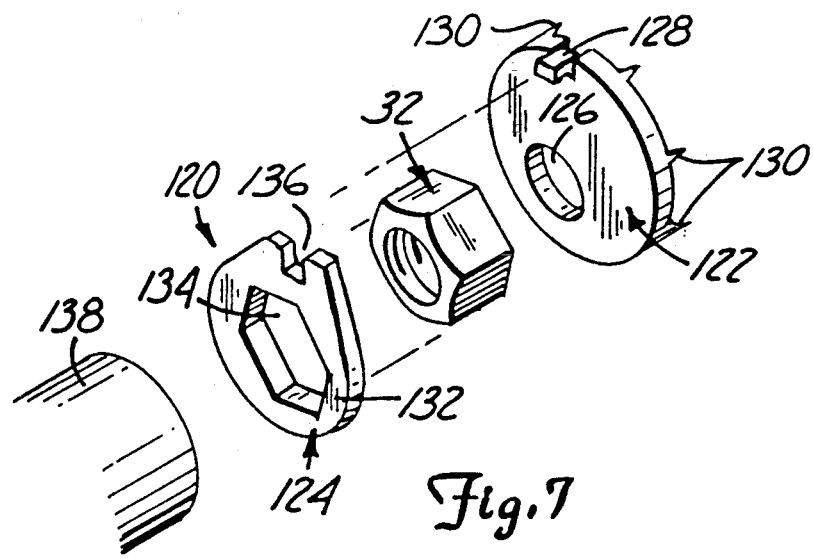
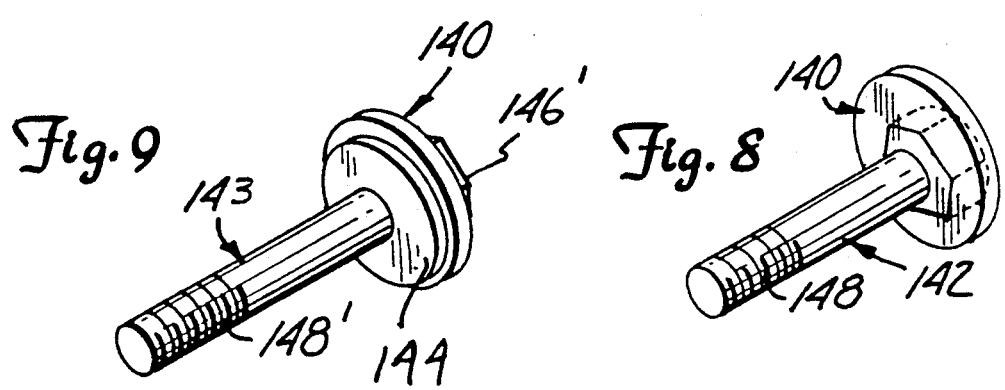
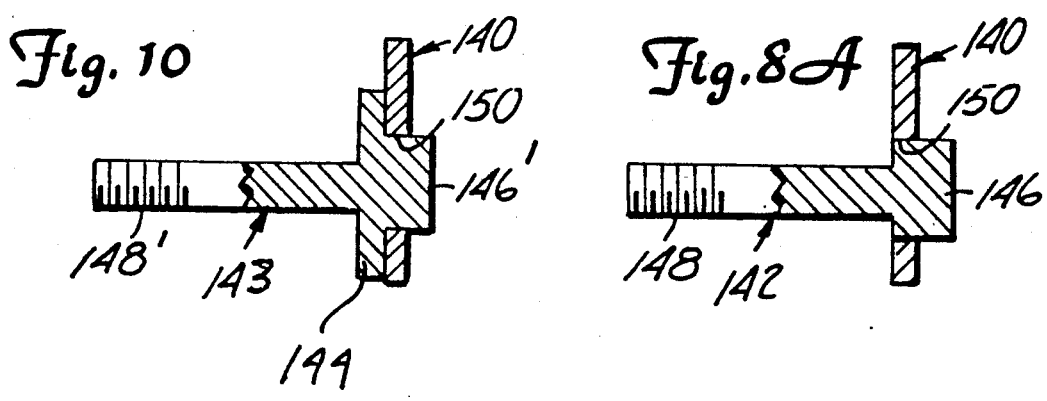

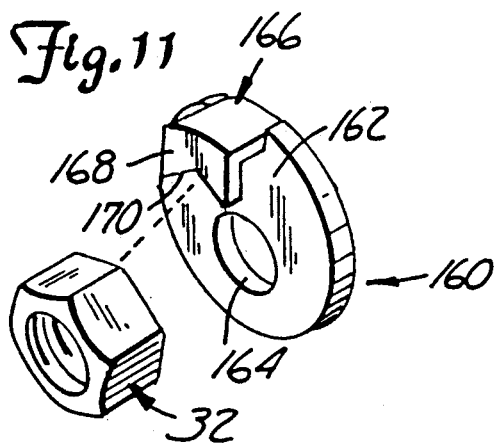
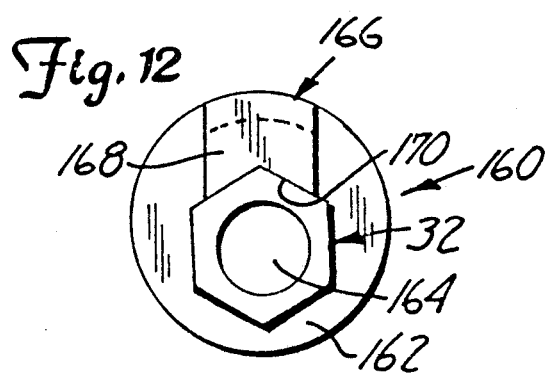
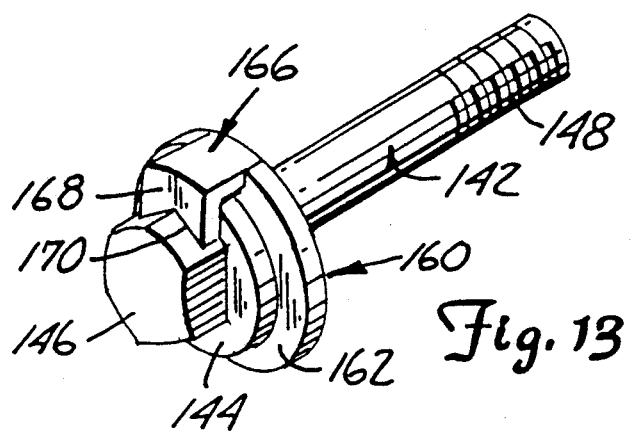

CAM WASHER FOR ADJUSTING WHEEL ALIGNMENT

BACKGROUND OF THE INVENTION

1. Field of the Invention.

The present invention relates to a device for adjusting at least one alignment characteristic in a suspension system in an automotive vehicle, and in particular, to a suspension system that is adjustable through an adjusting bolt.

2. Description of the Prior Art.

It is known to use cams for adjusting the relative position of two members, one of which is secured to the wheel and the other of which is secured to the frame of the car, the cams being initially adjusted in position and then being drawn tightly against engaging surfaces by a bolt on which the cams are supported. Various arrangements have been proposed for adjusting alignment characteristics in vehicles.

For example, the Trussell U.S. Pat. No. 2,772,596 shows an arrangement employing a shim which has serrations on it so that the shim when driven in does not tend to move.

The Slack U.S. Pat. No. 2,063,704 shows an arrangement in which there is a key that is inserted in the threads after adjustment has been made.

The Slack U.S. Pat. No. 2,162,828 shows two members having cooperating serrated surfaces which tend to register together to prevent the adjustment of the alignment from being disturbed.

The Ware U.S. Pat. No. 4,595,216 likewise shows an arrangement in which there are cooperating serrations which are locked together after the adjustment has been made in the alignment.

The Traugott U.S. Pat. No. 3,163,441 shows an arrangement in which there is a lock washer having a plurality of serrations on opposite sides thereof so as to bite into or grip the adjacent shoulder and adjustable bushing. This is designed to prevent the shift in the alignment characteristics. In the Traugott U.S. Pat. No. 3,124,370, a ring with serrated edges is used for the same purpose.

There are a number of other patents in the alignment field which describe mechanisms for limiting the amount of displacement which can occur after the adjustment has been made and tightened. These patents include the following:

| Inventor | U.S. Pat. No. |
| --- | --- |
| Porter | 751,202 |
| Johnson et al | 1,044,055 |
| Hale | 1,279,686 |
| Carpezzi | 2,674,465 |
| Davis | 2,846,250 |
| Traugott | 2,859,058 |
| Fegan | 2,934,684 |
| Morse | 2,962,317 |
| Weiss et al | 2,978,253 |
| Muller et al | 3,033,588 |
| Bridges | 3,880,444 |
| Pettibone | 4,616,845 |

SUMMARY OF THE INVENTION

The present invention includes a device for adjusting at least one alignment characteristic of an automotive vehicle wheel that is adjustable through an adjusting bolt and nut without having to replace the original bolt and nut. The device includes a cam member having an eccentrically disposed aperture that receives the bolt. The cam member includes a mechanism for detachably attaching the cam member to the nut or to the head of the bolt such that the cam member is rotatable by engagement of the nut or the head of the bolt. When the cam member is rotated, the member works against a cam bearing surface to move the bolt so as to adjust alignment of the vehicle wheel. In a preferred embodiment, the cam member includes a plurality of prongs that engage an adjacent surface, locking the cam member in a selected position.

BRIEF DESCRIPTION OF THE DRAWINGS

FIG. 1 is a perspective view of the device of the present invention in use.

FIG. 2 is an exploded perspective view of the device in FIG. 1.

FIG. 3 is a plan view of the cam member of the present invention.

FIG. 4 is an exploded perspective view of an alternative embodiment of the device of the present invention.

FIG. 5 is a sectional view of the device of FIG. 4.

FIG. 6 is an exploded perspective view of yet another alternative embodiment of the present invention.

FIG. 7 is a perspective view of yet a further alternative embodiment of the present invention.

FIG. 8 is a perspective view of yet another alternative embodiment of the present invention.

FIG. 8A is a partial sectional view of the embodiment of FIG. 8.

FIG. 9 is a perspective view of the embodiment of FIG. 8 used in association with a flanged bolt.

FIG. 10 is a partial cross-sectional view of the embodiment of FIG. 9.

FIG. 11 is a perspective view of yet another alternative embodiment of the present invention.

FIG. 12 is a front view of the embodiment of FIG. 11.

FIG. 13 is a perspective view of the embodiment of FIGS. 11 and 12 engaging a bolt head.

DETAILED DESCRIPTION OF THE PREFERRED EMBODIMENTS

Referring to FIG. 1, the present invention is generally indicated at 10 in use with a strut-type suspension system 12. The strut-type suspension system includes a substantially vertical strut member 14. A wheel 16 is connected to the strut member 14 by a connecting bracket assembly 18. The wheel 16 is connected to the strut member 14 by a wheel spindle section 20 which in turn is attached to the bracket assembly 18 with an upper nut and bolt assembly 22 and a lower nut and bolt assembly 24. The upper and lower bolt assemblies 22 and 24 extend through apertures in the wheel spindle 20 and the bracket assembly 18 as described and illustrated in U.S. Pat. Nos. 4,618,162 and 4,736,964 incorporated herein by reference.

The device of the present invention provides an arrangement wherein the original lower bolt may be used to adjust camber. Unlike prior art devices, such as described in the Specktor U.S. Pat. No. 4,736,964, in which the original bolt has to be discarded, the device of the present invention permits use of the original bolt and nut. In addition, the device of the present invention may be used with a replacement bolt, if a replacement bolt is needed.

The device of the present invention includes a cam member 26 having an eccentrically disposed aperture 28. The cam member 26 has a mechanism generally indicated at 30 for detachably attaching a nut 32. In the embodiment of FIGS. 2 and 3, the mechanism 30 includes spaced apart tab members 34 and 36 that are disposed 180 degrees from each other about the aperture 28. The tab members 34 and 36 extend outwardly from one side of the cam member and are spaced apart such that the tab members engage opposing sides 38 and 40 of the nut 32.

The bolt assembly 24 includes a bolt 42 having a shaft portion 44, a head portion 46, and a flange 48 adjacent the head portion 46. The shaft portion 44 includes a threaded section 50 that threadably engages the nut 32.

The bracket 18 includes first and second flanges 52 and 54 disposed on opposite sides of the spindle 20. Each flange 52 and 54 includes a cam bearing surface 56 and a cam engaging projection 58. In the arrangement illustrated in FIG. 1, the apertures in the bracket 18 are slotted, permitting lateral movement of the bolt and therefore movement of the spindle 20 with respect to the bracket 18. In another arrangement, the original bolt is removable and is replaced with a bolt of smaller diameter. The smaller diameter bolt permits movement of the spindle with respect to the bracket 18 when the cam member is worked against the cam bearing surfaces 56 and 58. Conversely, the aperture 60 may be drilled out to a larger diameter while the original bolt retained to obtain the same effect.

In all of the above-discussed arrangements, the nut 32 is placed between the tab members 34 and 36 of the cam member 26. The nut 32 is threaded on to the bolt 42 by turning the bolt within the nut 32 in a conventional fashion. Once the nut and the bolt snugly engage the bracket assembly 18, the nut 32 is turned using a conventional wrench. It will be readily apparent that any rotation of the nut 32 will result in corresponding rotary movement of the cam member 26. The cam member 26 will act against cam bearing surfaces 56 and 58 and result in sideways movement of the bolt shaft 44 within the aperture 60. Since the bolt extends through the arm 20, movement of the bolt will cause a shifting of the arm 20 thereby resulting in a tilting of the wheel assembly and a change in the camber of the wheel.

The cam member 26 includes a plurality of prongs 62 that face inwardly to engage the surface of the flange 54. The prongs are case hardened so that the prongs penetrate the surface of the flange 54.

In the case of a bolt without a flange 48, the cam member 26 may be positioned on the bolt shaft to engage the head of the bolt 46 in the same manner as the nut 32. In this arrangement, a second cam member 26 could also be used with the nut 32.

An alternative embodiment 70 of the present invention is illustrated in FIGS. 4 and 5. The embodiment 70 includes a cam member 74 and a cam member turning tool 76. The cam member 74 includes an eccentrically disposed bolt engaging aperture 78. The cam member 74 also includes a slot 80 preferably disposed on the periphery of the cam member 74. A plurality of case hardened prongs 82 project from one side of the cam member to engage a surface of the bracket 18.

The tool 76 includes a main body portion 84 having a chamber 86 of sufficient size to encompass the nut 32 and permit free rotation of the main body portion about the nut 32. A key member 88 is suitably attached, such as by welding, to an outer surface of the main body portion 84. The key member 88 includes a slot engaging portion 90 extending beyond the main body portion 84. The slot engaging portion 90 is of a size and configuration that fits into the slot 80. The tool 76 also includes a head portion 92 for engagement by a wrench. In the embodiment illustrated in FIG. 4, the head portion is hexagonal in configuration so that it is engagable by a standard socket-type wrench.

In use, the cam member 74 is used in much the same way as described with regard to the embodiment 26 of FIGS. 1 through 3. A bolt is placed through the apertures of the bracket 18 and the arm 20. The cam member 74 is placed over the protruding end of the bolt and the nut 32 is threadably attached to the bolt and tightened. The tool 76 is then placed over the nut 32 with the key portion 90 positioned within the slot 80 of the cam member. To adjust camber, the head 92 of the tool 76 is turned with a wrench, turning the main body portion 84 about the nut 32 with the key member 88 rotating the cam member 74 through engagement with the slot 80. The cam member 74 bears against the cam bearing surfaces 56 and 58, in the same manner as previously described in adjusting camber.

Yet another alternative embodiment 100 of the present invention is illustrated in FIG. 6. The embodiment 100 includes a cam member 102 and a cam member turning tool 104. The cam member 102 is of the same construction as the cam member 74 of FIGS. 4 and 5. The cam member 102 includes an eccentrically disposed bolt receiving aperture 106 and a slot 108 disposed on the periphery of the cam member 102. A plurality of case hardened prongs 110 extend from a side of the member that is to be placed adjacent to the bracket 108.

The tool 104 includes a flat main body portion of a thickness less than the thickness of the nut 32 such that the nut projects out from the tool sufficiently to be engaged by a wrench 118. The main body portion 112 includes an aperture 114 of the same configuration as the nut 32. In the specific embodiment illustrated, the nut 32 has a hexagonal wall configuration and the aperture 114 has a similar configuration. The tool 104 further includes a key member 116 extending outwardly therefrom of a size to engage the slot 108.

In use, the embodiment 100 is used in much the same manner as described with reference to the embodiment 70 of FIGS. 4 and 5. The cam member 102 is placed over the protruding threaded end of the bolt that projects from the bracket 18. The nut 32 is then threadably attached to the bolt and snugly tightened. The tool 104 is placed over the nut with the key 116 extending into the slot 108. The nut 32 protrudes outwardly from the tool 104 and is engagable by a conventional socket 118. As will be readily apparent, as the nut 32 is turned, the tool 104 is also turned thereby turning the cam member 102 through engagement of the key member 116 and the slot 108. The cam member 102 acts against the cam bearing surfaces 56 and 58 thereby adjusting camber, as previously described.

Yet another alternative embodiment 120 is illustrated in FIG. 7. The embodiment 120 includes a cam member 122 and a cam member turning tool 124. The cam member 122 includes an eccentrically disposed aperture 126 and a tab key member 128 extending outwardly from one side of the cam member 122. A plurality of case hardened prongs 130 extend from the cam member 122 to engage the surface of the bracket 18 as previously described.

The tool 124 includes a plate-type main body portion 132 of a thickness that is less than the thickness of the nut 32. The main body portion 132 includes an aperture 134 of the same configuration as the nut 32 so that the aperture 134 will engage the nut 32 and permit the nut to project out of the tool sufficiently for engagement by a wrench 138. The tool member 124 further includes a slot 136 of a size and configuration to engage the tab key member 128.

In use, the embodiment 120 is used in much the same manner as the embodiment 100 described with reference to FIG. 6. One difference between the embodiment 100 and 120 is that the tab key member is disposed on the cam member while the slot is in the tool. The cam member 122 is positioned over the protruding threaded portion of the bolt and the nut is then threaded on to the bolt and tightened. The tool 124 is placed over the nut with the slot 136 engaging the key member 128. The nut 32 will protrude a sufficient distance outwardly from the tool 124 so that a conventional socket 138 can engage the nut 32. As the nut 32 is turned, the tool 124 through its engagement with the tab key member 128 rotates the cam member 122. The cam member 122 will work against the cam bearing surfaces 56 and 58 of the bracket 18 thereby moving the bolt and adjusting camber, as previously described.

Yet another alternative embodiment 140 is illustrated in FIGS. 8, 8A, 9, and 10. In FIGS. 8 and 8A, the embodiment 140 is illustrated in association with a bolt 142 having no flange. The bolt 142 includes a hexagonal head portion 146 and a shaft portion 148. The embodiment 140 includes an eccentrically disposed opening 150 having the same configuration as the head of the bolt. In the example illustrated, the opening is hexagonal in configuration to accept the hexagonally configured head 146 of the bolt.

In a further arrangement using the embodiment 140, which is illustrated in FIGS. 9 and 10, the embodiment 140 is used in association with a bolt 143. The bolt 143 is similar to the bolt 42 illustrated in FIGS. 1, 2, and 3, and includes a flange portion 144. The bolt 143 also includes a shaft portion 148' and a head portion 146'. The head portion 146' has a configuration similar to the configuration of the opening of the opening 150 of the embodiment 140. In the example illustrated, the configuration is hexagonal.

Yet another alternative embodiment 160 is illustrated in FIGS. 11 through 13. The embodiment 160 includes a main body portion 162 and an eccentrically disposed aperture 164. The embodiment 160 further includes a tab member 166 projecting away from one face of the cam member 160. The tab member 166 includes a nut or bolt head engaging portion 168. The portion 168 includes a nut or bolt head engaging surface 170 configured to engage the side walls of the nut or bolt head. In the embodiment illustrated, the nut has a hexagonal configuration. The surface 170 is configured to engage two sides of the nut 32 to prevent the nut from rotating, as best illustrated in FIG. 12.

As illustrated in FIG. 13, the portion 168 is spaced from the main body portion 162 so that a bolt having a flange may be used with the cam member 160. The flange of the bolt is positioned between the portion 168 and the main body portion 162.

In either case, whether the device 160 is used in association with a nut 32 or with a bolt, the device 160 is easily attached and securely fixes the device 160 with respect to the nut or to the head of the bolt. The nut or bolt head projects beyond the member 168, and is engagable by a conventional socket-type wrench. Turning the nut 32 or the head of the bolt, will rotate the cam member 160. The cam member 160 acts against cam bearing surfaces 56 and 58 of the bracket 18, moves the bolt to adjust camber.

Although the present invention has been described with reference to preferred embodiments, workers skilled in the art will recognize that changes may be made in form and detail without departing from the spirit and scope of the invention.

What is claimed is:

1. A device for adjusting at least one alignment characteristic of an automotive vehicle wheel having a suspension system with an adjusting bolt that is threadably secured by a nut, the adjusting bolt and nut being tightenable through engagement of the nut or the head of the bolt, the device comprising:
   a cam member having an eccentrically disposed aperture for receiving the bolt; and
   means for detachably attaching the cam member directly to the nut or to the head of the bolt such that the cam member is rotatable about an axis of the bolt through direct engagement of the nut or the head of the bolt.

2. The device of claim 1 wherein the means for detachably attaching the cam member includes spaced apart tab members projecting outwardly from the cam member for engaging opposing sides of the nut or the head of the bolt.

3. The device of claim 1 wherein the means for detachably attaching the cam member to the nut or to the head of the bolt includes side walls of the eccentrically disposed aperture arranged in the same configuration as side walls of the nut or the head of the bolt and the cam member being of a thickness sufficient to permit the nut or the head of the bolt to project beyond the cam member a sufficient distance to be engagable by a wrench.

4. The device of claim 1 wherein the means for detachably attaching the cam member to the nut or to the head of the bolt includes a tab member projecting from the cam member a distance sufficient to engage at least two side wall surfaces of the nut or the head of the bolt.

5. The device of claim 4 wherein the adjusting bolt includes a flange portion and the tab member is spaced from the cam member a distance sufficient to accommodate the flange portion.

6. The device of claim 1 wherein the cam member has a plurality of prongs extending outwardly from one face thereof.

7. A device for adjusting at least one alignment characteristic of an automotive vehicle wheel having a suspension system with an adjusting bolt that is threadably secured by a nut, the adjusting bolt and nut being tightenable through engagement of the nut or the head of the bolt, the device comprising:
   a cam member having an eccentrically disposed aperture for receiving the bolt;
   means for detachably attaching the cam member to the nut or to the head of the bolt such that the cam member is rotatable about an axis of the bolt through engagement of the nut or the head of the bolt; and
   wherein the cam member includes a slot and wherein the means for detachably attaching the cam member to the nut or the head of the bolt includes a tool member having a head portion engagable by a wrench, a main body portion positionable over the nut or the head of the bolt while permitting rotatable movement of the main body portion, and a key portion attached to the main body portion and having an end portion for engaging the slot.

8. A device for adjusting at least one alignment characteristic of an automotive vehicle wheel having a suspension system with an adjusting bolt that is threadably secured by a nut, the adjusting bolt and nut being tightenable through engagement of the nut or the head of the bolt, the device comprising:

a cam member having an eccentrically disposed aperture for receiving the bolt;

means for detachably attaching the cam member to the nut or to the head of the bolt such that the cam member is rotatable about an axis of the bolt through engagement of the nut or the head of the bolt; and wherein the cam member includes a slot and wherein the means for detachably attaching the cam member to the nut or the head of the bolt includes a plate member having an aperture disposed therein configured to engage the nut or the head of the bolt and permitting the nut or the head of the bolt to project beyond the plate a distance sufficient to be engagable by a wrench and including a key portion for engaging the slot of the cam member.

9. A device for adjusting at least one alignment characteristic of an automotive vehicle wheel having a suspension system with an adjusting bolt that is threadably secured by a nut, the adjusting bolt and nut being tightenable through engagement of the nut or the head of the bolt, the device comprising:

a cam member having an eccentrically disposed aperture for receiving the bolt;

means for detachably attaching the cam member to the nut or to the head of the bolt such that the cam member is rotatable about an axis of the bolt through engagement of the nut or the head of the bolt; and wherein the cam member includes a key portion projecting outwardly therefrom and the means for detachably attaching the cam member to the nut or the head of the bolt includes a plate member having an aperture therein configured to engage the nut or the head of the bolt and being of a thickness such that the nut or the head of the bolt projects beyond the plate member a distance sufficient to be engagable by a wrench and including a slot engagable by the key portion of the cam member.

* * * * *